UNITED STATES PATENT OFFICE.

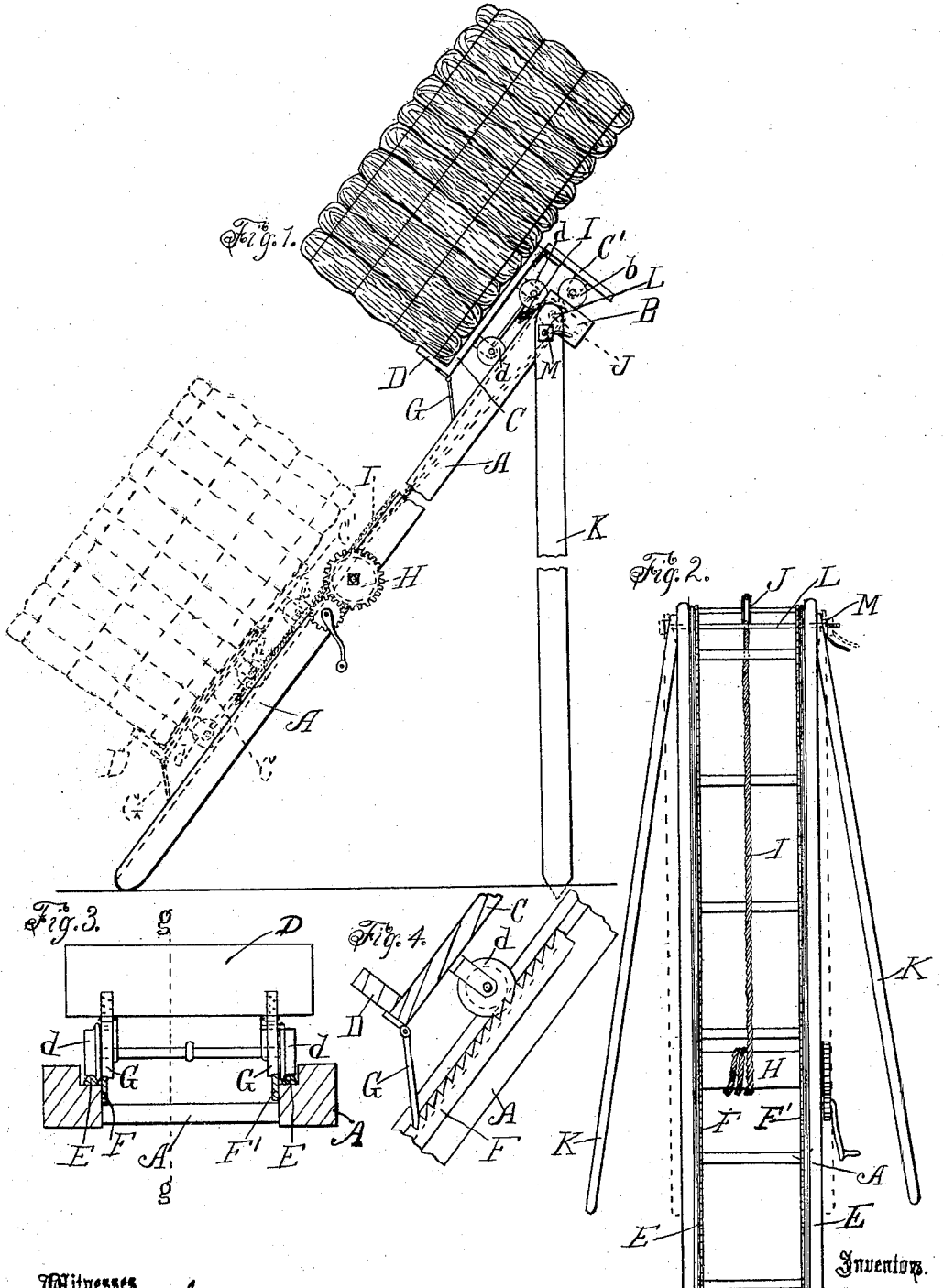

CONRAD BAKER AND ISAIAH BAKER, OF SANTA ANA, CALIFORNIA.

TRUCK-ELEVATOR.

SPECIFICATION forming part of Letters Patent No. 473,441, dated April 26, 1892.

Application filed January 14, 1892. Serial No. 418,004. (No model.)

*To all whom it may concern:*

Be it known that we, CONRAD BAKER and ISAIAH BAKER, citizens of the United States, residing at Santa Ana, in the county of Orange and State of California, have invented a new and useful Improvement in Truck-Elevators, of which the following is a specification.

The object of our invention is to provide a portable elevator for handling packages of merchandise, farm produce, &c.—such as baled hay, sacked grain and potatoes, &c.—which will be specially convenient of discharge.

The accompanying drawings illustrate our invention.

Figure 1 is a plain side elevation of our invention, showing the truck in position for discharging a bale of hay with which it is loaded. Another position of the truck and bale is indicated in dotted lines. Fig. 2 is a plain rear elevation of the frame of the elevator, the truck being removed. Fig. 3 shows the tramway in cross-section and the rear end of the truck with the ratchet. Fig. 4 is a longitudinal section of a portion of the truck on line $g\ g$, Fig. 3.

Our invention consists in the combination of a tramway comprising an inclined main member A and a supplemental drop member B, arranged at the upper end of the main member substantially at right angles thereto and inclined downward therefrom to receive and steady the wheels of the supplemental portion of the truck when the truck is in its discharging position, a truck comprising the main or body portion consisting of the series of wheels $d$, arranged to run upon the main member of the tramway, and the main platform C and tail-board D, and the supplemental portion of the truck comprising the supplemental platform C′, shorter than the main platform and hinged by its rear edge to the front edge of the main platform C, and the supplemental drop-wheels $b$, arranged to run upon the tramway to support the supplemental platform and to run down upon the drop member of the tramway to lower the supplemental platform and remove it from its engagement with the load when the truck is brought into position at the top of the tramway, and means for moving the truck up and down the tramway. The main portion C of the platform is preferably of a length slightly less than half the length of the packages to be handled, so that a package placed thereon in the inclined position shown in the drawings and resting against the tail-board D will not overbalance when unsupported by the supplemental platform C′.

The truck may be adapted for use with packages of different lengths by providing a movable tail-board with means for fixing it upon the platform at different points nearer to or farther from the hinged platform; but as no invention is involved in making the tail-board movable and the same result can be obtained by interposing a box or other object between the tail-board and the package the tail-board is shown fixed to the platform. The main member of the tramway is provided with the tram-rails E E, made of half-round iron, and with ratchet-bars F F′, arranged alongside of the rail to recive the ends of the pawls G, which are pivoted to the truck and engage the ratchet-bars to prevent the truck from running back except when the pawls are raised out of such engagement. The supplemental or drop member B of the tramway corresponds with the member A, except that it is short and is not provided with ratchet-bars. A windlass H is secured to the main member A, and a rope I, attached at one end to the truck, runs over a pulley J at the top of the tramway and is attached at its other end to the windlass. Two legs K are pivoted to the upper end of the tramway by a rod L, passed through the tramway and legs, and a nut M is provided to screw thereupon to hold them in place. The upper ends of the legs are beveled on the face that fits against the tramway, so that when the nut is screwed tight the legs will stand out, as shown in Fig. 2, while by unscrewing the nut the legs may be sufficiently released to allow them to fold against the tramway, as indicated in dotted lines in Fig. 2.

It will be understood from the drawings that the main platform is supported by four wheels $d$, and a supplemental hinged platform is supported by two wheels $b$. In practice when the truck is at the foot of the tramway all six wheels are held in the same plane, as is indicated by dotted lines in Fig. 1. When the truck has been drawn to the top of the tramway, the wheels b of the supplemental platform descend the supplemental member B of the tramway, and thus allow the supplemental hinged platform C' to drop down, as shown in Fig. 1, so that the package can be tilted forward, and thus easily discharged.

It is to be understood that our invention is not limited to the special mechanism shown to draw the truck up the incline.

Now, having described our invention, what we claim as new, and desire to secure by Letters Patent, is—

1. The combination, set forth, of the tramway comprising an inclined main member and a supplemental drop member arranged at the upper end of the main member and inclined downward therefrom to receive and steady the wheels of the supplemental portion of the truck when the truck is in its discharging position, a truck comprising the main or body portion consisting of the series of wheels $d$, arranged to run upon the main member of the tramway, and the main platform and tail-board, and the supplemental portion of the truck comprising the supplemental platform shorter than the main platfrom, hinged by its rear edge to the front edge of the main platform, and the supplemental drop-wheels arranged to run upon the tramway to support the supplemental platform and to run down upon the drop member of the tramway to lower the supplemental platform and remove it from its engagement with the load when the truck is brought into position at the top of the tramway, and means for moving the truck up and down the tramway.

2. The combination, set forth, of the tramway having the inclined main member and the supplemental drop member arranged at the upper end of the main member and inclined downward therefrom to receive and steady the wheels of the supplemental portion of the truck when the truck is in its discharging position, the truck comprising the main or body portion and a supplemental portion hinged thereto, each provided with wheels arranged to run upon the tramway, the wheels of the supplemental portion being adapted to run down upon the drop member of the tramway to lower the supplemental portion and remove it from its engagement with the load when the truck is brought into position at the top of the tramway.

CONRAD BAKER.
ISAIAH BAKER.

Witnesses:
JAMES R. TOWNSEND,
C. W. HUMPHREYS.